(No Model.)
S. H. SHORT.
ELECTRIC EQUIPMENT FOR VEHICLES.
No. 592,259. Patented Oct. 26, 1897.
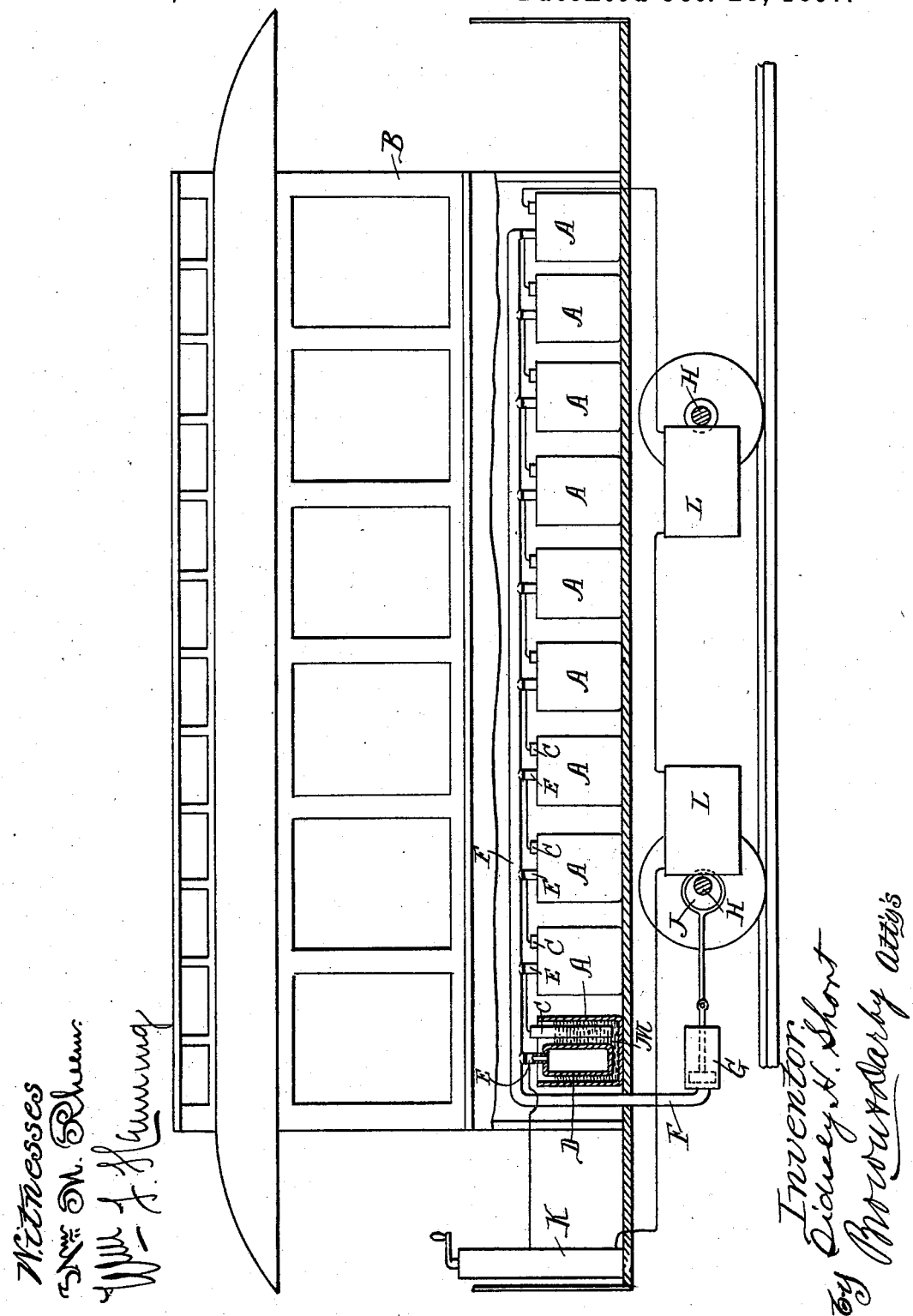

UNITED STATES PATENT OFFICE.

SIDNEY H. SHORT, OF CLEVELAND, OHIO.

ELECTRIC EQUIPMENT FOR VEHICLES.

SPECIFICATION forming part of Letters Patent No. 592,259, dated October 26, 1897.

Application filed August 27, 1896. Serial No. 604,140. (No model.)

*To all whom it may concern:*

Be it known that I, SIDNEY H. SHORT, a citizen of the United States, residing at Cleveland, in the county of Cuyahoga and State of Ohio, have invented a new and useful Improvement in Electric Equipment for Vehicles, of which the following is a specification.

This invention relates to the electric equipment of vehicles.

The object of the invention is to provide apparatus adapted to be mounted on and carried by the vehicle for generating and supplying a current of electricity for the driving-motor, lighting or signaling apparatus of such vehicle, or for other purposes and uses.

The invention consists substantially in the construction, combination, location, and relative arrangement of parts, all as will be more fully hereinafter set forth, as shown in the accompanying drawing, and finally specifically pointed out in the appended claim.

In the single view of the accompanying sheet of drawing I have shown the principle of my invention as applied to the generation of a current of electricity for operating the driving-motors of street-cars.

In carrying out my invention I make use of the discovery that the latent or potential energy of carbon or carbonaceous material can be directly converted into electrical energy in an energetic, efficient, and constant manner by employing the carbon or carbonaceous material in any form—as prepared carbon plates or as coal, coke, or the like—as the positive plate or the negative pole or terminal of a battery-cell, wherein the negative plate, and hence the positive pole or terminal, comprises a body or mass of oxidizable or oxidized metal, which may be of a porous or spongy texture. The elements of the cell are placed in a suitable electrolyte capable of receiving and transferring electrochemically the oxygen from the negative to the positive or carbon plate, whereby the carbon is oxidized and consumed, and a current of electricity is generated by such oxidation and consumption of the carbon element. In order that an energetic, efficient, and constant generation may be effected, I supply fresh oxygen artificially—as, for instance, in the form of air—to and through the oxidizable metal composing the negative plate of the cell. This can be done in a simple manner, as by making the said negative plate in the form of a hollow body, to the interior of which the oxygen or air may be supplied, as from a suitably arranged and actuated pump, or the oxygen may be made to come in contact with the surface of the metal and produce an oxid thereof.

In the drawing I have shown a battery composed of a series of cells A of the character described, coupled up in series to secure the desired electromotive force and arranged in any suitable or convenient manner upon a vehicle B—say, for instance, a street-car.

C designates the carbon or positive plate, and D the porous or spongy oxidizable or oxidized body forming the negative plate of the cell, which may be spongy metallic lead or spongy peroxid of lead and which may be formed into a hollow cylinder or hollow, flat, or other-shaped body, with the interior of which communicates a short section of pipe E. The several series of sections of pipes E for the series of cells composing the battery each communicate with, but are insulated from, an air-pipe F, which is common to all of said cells and which constitutes the delivery-pipe of an air-pump G, suitably and conveniently mounted on the vehicle and actuated in any convenient manner, as from an axle or other rotating part H, as by means of an eccentric J.

K designates a suitable or conveniently-arranged switch or controller by which the circuit of the batteries is governed. Of course it will be readily seen and understood that the pump G may be actuated from any desired or convenient form of motor arranged in the circuit of the terminals of the battery.

In the particular form and arrangement illustrated in the drawing I have shown the battery as applied to the generation of current for the car-driving motors L L, but, of course, it will be readily seen that any desired or required translating device may be arranged in the circuit of the terminal of the battery and be actuated by the current generated by such battery—such, for instance, as the lighting, heating, signaling apparatus, and the like. Any suitable electrolyte M may be employed which possesses the capability of transferring electrochemically the oxygen from the negative to the positive plate of the cell. I have found that a mixture of sulfuric acid and water will answer the purpose.

While I have shown my invention as applied to the operation of the driving-motor of street-cars, it will be readily seen that the principles thereof may be applied to the propulsion of any other form of vehicles, such as carriages and boats, and the energy may be applied to the lighting of bicycle or carriage lamps, or the lighting, heating, or other translating devices or apparatus employed on any kind of moving vehicles.

From the foregoing description it will be seen that the electric generation is effected without loss or diminution of the body, potency, or efficiency of the negative plate of the cell or of the electrolyte, the entire generation being effected at the sole expense of carbon oxidation and consumption, and as rapidly as the carbon element is consumed it can be readily, easily, and cheaply renewed or replenished.

Having now set forth the object and nature of my invention and a form of apparatus embodying the principles thereof and having explained the function, arrangement, and mode of operation thereof, I desire it to be distinctly understood that I do not limit or restrict myself to the exact details, form, material, or arrangement shown and described, as many changes and variations therefrom would readily suggest themselves to persons skilled in the art and still fall within the spirit and scope of my invention; but What I do claim as new and useful and of my own invention, and desire to secure by Letters Patent of the United States, is—

The combination with a movable vehicle, of translating devices carried thereby, a carbon in electrical connection with one of the terminals of said translating device, a metallic oxidizable material in electrical connection with the other terminal of said translating device, an aqueous electrolyte maintained in an unheated condition in which said carbon and metallic material are immersed or partially immersed, a pump carried by said vehicle, and arranged to deliver oxygen to said electrolyte through said metallic material, and means actuated by the movement of the vehicle for operating said pump, as and for the purpose set forth.

In witness whereof I have hereunto set my hand this 22d day of August, 1896.

SIDNEY H. SHORT.

Witnesses:
F. W. BUNTS,
ROBT. T. BONE.